A. C. SPRINGER.
Tap and Faucet for Barrels.

No. 162,427. Patented April 20, 1875.

Witnesses
Geo. H. Strong.
John L. Borne

Inventor
Amos C. Springer
by Dewey & Co
his Attorneys

UNITED STATES PATENT OFFICE.

AMOS C. SPRINGER, OF SAN FRANCISCO, CALIFORNIA.

IMPROVEMENT IN TAPS AND FAUCETS FOR BARRELS.

Specification forming part of Letters Patent No. 162,427, dated April 10, 1875; application filed April 2, 1875.

*To all whom it may concern:*

Be it known that I, AMOS C. SPRINGER, of San Francisco city and county, State of California, have invented a Tap and Faucet for Barrels; and I do hereby declare the following description and accompanying drawings are sufficient to enable any person skilled in the art or science to which it most nearly appertains to make and use my said invention, without further invention or experiment.

My invention relates to certain improvements in that class of devices for drawing liquids, which consist of a tap to be permanently fitted into the vessel, and a removable cock or faucet, and it is of more especial value for beer-barrels and for the gage-cocks of steam-boilers, or other containing vessels which have an interior pressure. It consists, first, of a hollow cylindrical tube, which is permanently fixed in the barrel or other vessel, and is provided at its inner end with a hollow plug, having two or more screw-threads upon the outside, and a soft-metal packing upon a shoulder at the inner end, by which it is made tight. Combined with this portion is a cock or faucet, which has a slot at its inner end, to fit over a corresponding projection upon the plug. A rubber packing-ring surrounds the stem of this faucet, and fits closely the smooth interior of the stationary tube, so that when a half-turn is given the faucet, to screw the plug back, no liquid can escape. A simple nut surrounds the tube of the faucet, and, by screwing it into the tube, connects the whole together.

Figure 1:
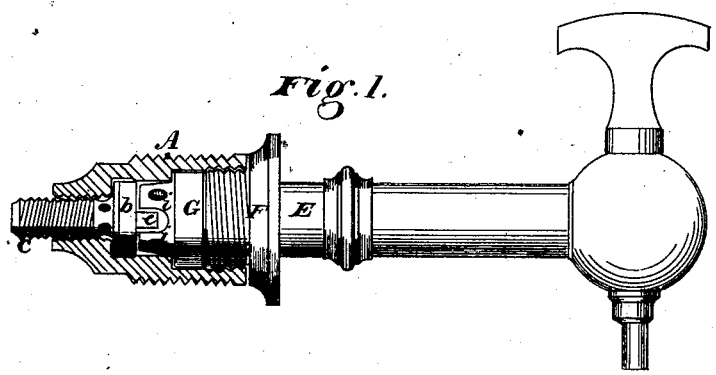
Figure 2:
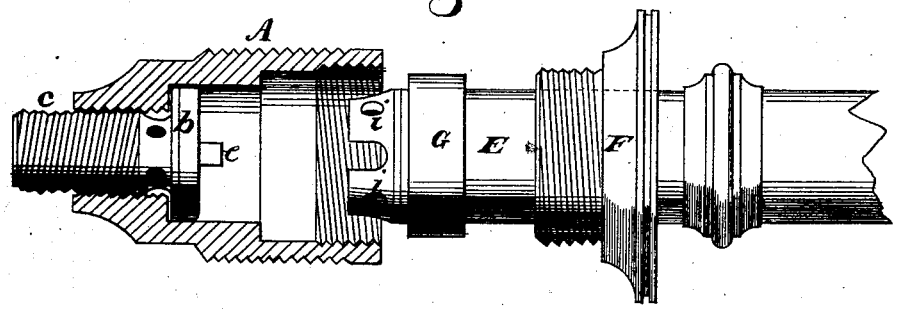
Figure 3:
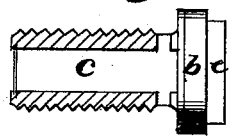

Referring to the accompanying drawings, for a more complete explanation of my invention, Figure 1 is a side elevation of my device, with section of the tap. Fig. 2 is an enlarged section. Fig. 3 is a sectional view of the plug.

A is a hollow cylindrical tube, having screw-threads upon its exterior surface to hold it into the head of the cask. The inner end of this tube has its bore considerably smaller than the rest of it, and this leaves a shoulder, upon which the head $b$ of the screw-plug $c$ can rest when it is screwed down. The inner face of this shoulder is preferably of soft metal, to insure a tight joint when it is screwed down. The plug $c$ has two or more screw-threads cut upon its outside. In the present case, I have made four threads, so as to give the screw such a rapid pitch that one-half a turn will move the shoulder $b$ sufficiently far from the face to open a passage to the interior of the vessel. The plug $c$ is hollow, provided, if desired, with a strainer upon its inner end, and having holes opening through its sides, just under the shoulder $b$, so that as soon as the shoulder is withdrawn from its bearing the liquid can flow into the larger part of the tube A, and from thence into the cock. The cock or faucet may be of any ordinary construction, and has a portion of its length near the inner end made perfectly cylindrical, as at E, to allow a loose collar or nut, F, to slide upon it. The inner end of this cock has a slot made across it, and the plug $c$ has a similar projection, $e$, upon its head, so that the stem of the cock can be pushed into the tube A, and the slot will fit the projection at once. Any equivalent device may be employed to make this connection, but the one here described is the simplest and most convenient. Around the stem E a groove is cut near the inner end, and into this groove a rubber ring, G, is fitted. This ring fits closely into the smooth interior of the tube A and upon a shoulder above the seat of the shoulder $b$, and it will be manifest that when the stem is turned so as to withdraw the screw-plug $c$, and admit the liquid into the space below, this packing-ring will prevent any of the liquid from passing out beyond it. Holes $i$ $i$ in the end of the stem E admit the liquid to the interior of the faucet. In order to connect the faucet-tube with the tube A, it is only necessary to screw the loose nut or collar F into the tube, as shown, and the connection will be made; and it will be seen that there is no chance for leakage, as the rubber is firmly compressed between the collar F and the shoulder in the tube A.

The operation will be as follows: The vessel being full of liquid under pressure, the shoulder $b$ will be screwed down tight, until it is desired to draw out a portion of the liquid. The stem E of the faucet is inserted into the tube A, and pushed in until the slot fits over the projection $e$ of the plug. The elastic ring G fits closely the smooth interior of the tube A, and it will be seen that if the faucet be turned half around, a communication will be opened between the interior of the plug $c$ and the interior of the faucet, without the slightest chance of leakage after the collar F is screwed into place, as the ring G will be firmly compressed and fit the cylinder tightly. In practice, the faucet is introduced bottom up and the collar screwed down. A half-turn is then given to the faucet, and this (from the rapid pitch of the screw upon the plug) will open the passage sufficiently. At the same time, as an additional security against leakage, this half-turn brings the elastic ring G against the inner face of the collar F still more closely, thus compressing it so as to make a very tight fit. To remove the faucet, it will be necessary to give it a half-turn backward to loosen this ring before unscrewing the collar F, and this will insure the closing of the plug, so that no leakage can occur. A loose washer is placed beneath the ring G, and thus prevents the ring from being cut or worn. By this construction I insure a perfect working tap and faucet, and it will not be possible for it to leak, as most devices of this class do before they are screwed down to a bearing. It is also equally available for a gage-cock for boilers, and, as will be seen, the cock can be removed and reground when necessary, by simply screwing the plug down tight and then removing the cock. As the plug $c$ turns out instead of into the vessel, it can be easily removed at any time to clean the vessel, and is not likely to become clogged with sediment.

Having thus described my invention, what I claim, and desire to secure by Letters Patent, is—

1. The cock or faucet constructed with the cylindrical portion E, and provided with the elastic ring G fitting the tube A, in combination with the plug $c$, having two or more threads, as shown, and the shoulder $b$, working in the tube A, the whole operating substantially as herein described.

2. The tube A, with its peculiarly constructed screw-plug $c$, in combination with the faucet or cock having the securing or holding collar F, through which the cock moves loosely, as shown, and the elastic packing-ring G, the whole operating substantially as and for the purpose herein described.

AMOS C. SPRINGER.

Witnesses:
JNO. L. BOONE,
F. W. BLAKE.